Sept. 13, 1927.　　　　　　　F. J. JARECKI　　　　　　　1,642,549
WELDING FIXTURE
Filed Feb. 28, 1927　　　　4 Sheets-Sheet 1

Inventor
Frank J. Jarecki
By Frank E. Liverance, Jr.
Attorney.

Sept. 13, 1927.  
F. J. JARECKI  
WELDING FIXTURE  
Filed Feb. 28, 1927

Inventor  
Frank J. Jarecki  
By Frank E. Liverance, Jr.  
Attorney.

Sept. 13, 1927.  
F. J. JARECKI  
WELDING FIXTURE  
Filed Feb. 28, 1927  
1,642,549  
4 Sheets-Sheet 3

Inventor  
Frank J. Jarecki  
By Frank E. Liverance Jr.  
Attorney.

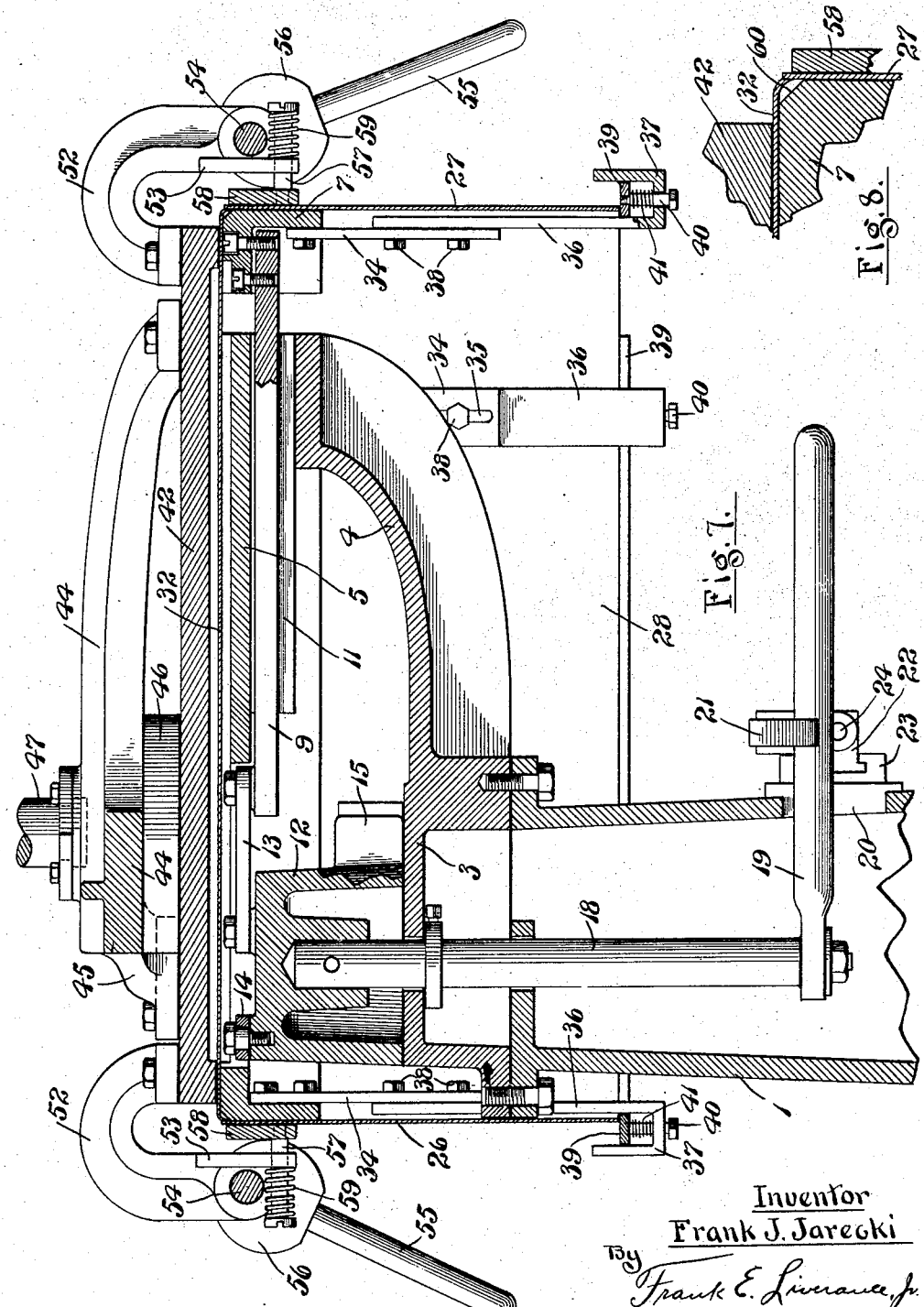

Patented Sept. 13, 1927.

1,642,549

UNITED STATES PATENT OFFICE.

FRANK J. JARECKI, OF GRAND RAPIDS, MICHIGAN.

WELDING FIXTURE.

Application filed February 28, 1927. Serial No. 171,542.

This invention relates to welding apparatus and is more particularly concerned with apparatus over which refrigerator linings may be placed and have a side or back welded thereto. The present construction is particularly designed for holding refrigerator linings of the so-called L-shape type and clamping a back in proper position with respect thereto, that the edges of the back may be welded to the adjacent edges of the bottom, top and sides of the lining.

It is an object and purpose of the present invention to provide a welding fixture of the character outlined with which the parts of the linings may be securely held and clamped in place so as to be readily welded along their engaging or contacting edges. The structure includes many novel constructions and arrangements of parts for effectively attaining this end. A further object of the invention is to provide a fixture of this character wherein suitable adjustments are provided for variations in sizes or for different sizes of linings which are to be welded, thereby obviating the necessity of having several of the fixtures for several different sizes of linings which do not vary greatly in dimensions.

For an understanding of the invention reference may be had to the following description taken in connection with the accompanying drawings, in which, Fig. 1 is a side elevation of the welding fixture showing the same holding a refrigerator lining in place ready for welding.

Fig. 7 is a fragmentary enlarged vertical section substantially on the plane of line 7—7 of Fig. 3, and Fig. 8 is a fragmentary enlarged section illustrating the air space underneath a joint which is to be welded.

Like reference characters refer to like parts in the different figures of the drawings.

Figure 5:
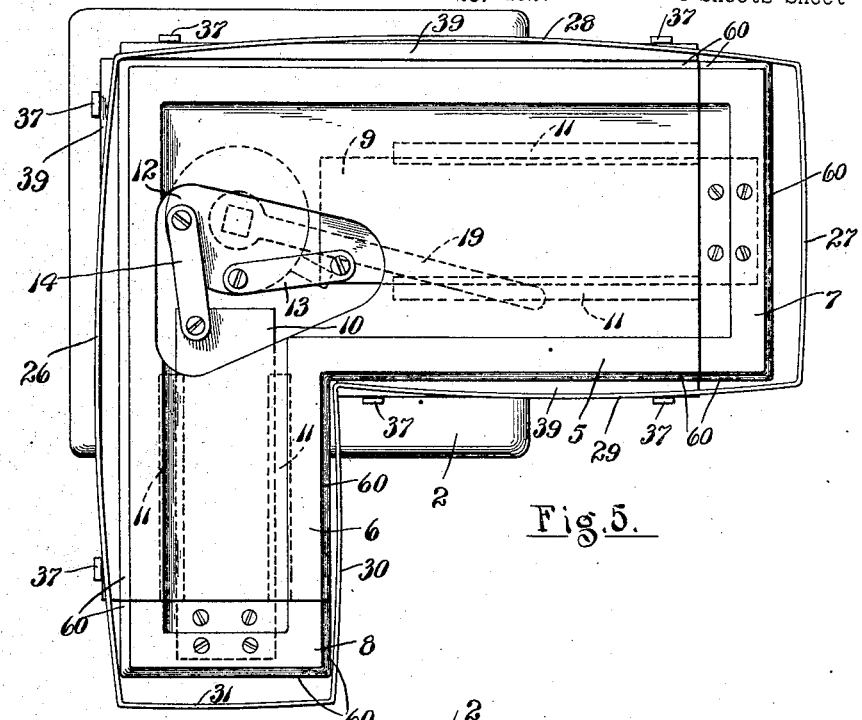
Fig. 5 is a plan view of the welding fixture before the upper clamping head is applied and before the outwardly projecting inner clamps are extended.

In the construction of the welding fixture or apparatus a vertical hollow post or pedestal 1 is provided, having the usual base 2 which is attached to the floor. At the upper end of the pedestal 1 a head 3 is permanently secured, having outward extending and upwardly turned arms 4 to which a horizontal table is secured. The table is of L-shape, having two sections 5 and 6 lying at right angles to each other, as best shown in Fig. 5.

At the outer ends of each of the sections 5 and 6 extensions 7 and 8, which form the inner clamps to engage the inner sides of the refrigerator lining, are located, each having a length equal to the width of its respective section 5 or 6 of the table. These members 7 and 8 are detachably secured by means of screws or equivalent fastenings to the outer ends of slides 9 and 10 which are slidably mounted for longitudinal movement on spaced apart guides 11 made on the sections 5 and 6 of the table. Over the head 3 described and lying against the same, is a member 12 of substantially cylindrical form which is adapted to be oscillated about its vertical axis. Two links 13 and 14 connect the member 12 with the inner ends of the two slides 9 and 10. The points of attachment of the links 13 and 14 to the member 12 are at a distance from its center so that oscillation of the member 12 causes a simultaneous reciprocatory movement of the two slides 9 and 10. A lug 15 projects radially from the member 12 (see Fig. 6) and in one direction of its movement comes against the end of a stop screw 16 adjustably mounted through a bracket 17 permanently secured to the head 3. This limits the extent to which the clamping members 7 and 8 may be moved outwardly, it being evident that by changing the position of the screw 16 the outward movement of the members 7 and 8 may be adjusted as desired.

The member 13 is fixed at the upper end of a vertical rock shaft 18 which extends downwardly through the head 3 and into the pedestal 1. A handle 19 is secured at the lower end of the shaft 18 and extends horizontally outward through an opening 20 in a side of the pedestal. This handle, when swung to one extreme of its movement, is automatically engaged by a latch dog 21 pivotally mounted on a block 22 which, in turn, is mounted for slidable adjustment in guides 23 on the outer side of the pedestal 1 at one end of the opening 20 therethrough. The adjustment is effected by a threaded bolt 24 which threads through the block 22 and passes through a permanently secured bracket 25 secured to the pedestal so that the block with the attached dog 21 may be moved back and forth and have a limited adjustment. This adjustment is changed whenever the adjustment of the stop screw 16 is changed so as to correspond therewith and cause the handle 19 to be engaged by the latch dog 21 at the time the lug 15 engages against the end of the top screw 16.

Figure 4:
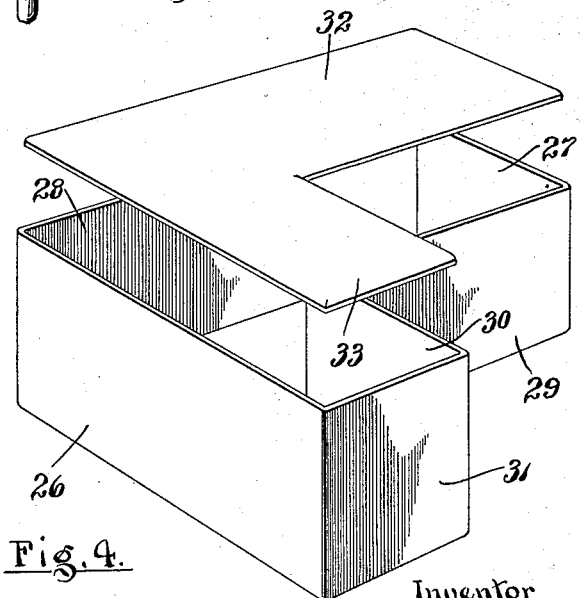
Fig. 4 is a perspective view of the lining which is held on the fixture, the back thereof being shown separated and as it is before it is welded in place.

Around this table with its extensible clamping members 7 and 8 an L-shape lining which has not yet been supplied with a back may be placed. The lining (see Fig. 4) has a bottom 26, a shorter upper end or top 27, a vertical side 28 connecting the bottom and top at one of the ends thereof, a second vertical side 29 which extends downwardly from the other end of the top 27 for a distance parallel to the side 28, and which is then bent outwardly to make a second top member 30 parallel to the bottom and between the bottom and the top 27, this part of the lining being completed by an additional side portion 31 parallel to the sides 28 and 29, but set out farther than the side 29, as shown. This part of the lining is made from a single length of flat metal bent into proper shape and welded where the ends of the length of metal used come together. The lining is completed by a back of L-shape having the two sections 32 and 33 lying at right angles to each other. It is evident that this back fits the lining member first described and when it is welded all around its edges to the lining member first described, a one piece lining of sheet metal is provided of L-shape open at the front.

The lining member without the back is placed around the L-shaped table and over the extensible clamping members 7 and 8 as previously described. In order to support this lining member a number of vertical bars 34 are attached at different sides of the table and to the members 7 and 8. These bars are formed with vertical slots 35 closed at both ends. Attached to the lower portions of the bars 34 are other bars 36 which, at their lower ends, are bent into U-form, as indicated at 37. The bars 36 may be vertically adjusted and held in any position to which adjusted, clamping or set screws 38 being used which pass through the slots 35 described. In the U-shaped lower end portions 37 of the bars 36 horizontal supporting bars 39 are located. To the bars 39 headed screws are attached, the same extending upwardly through openings in the lower side of the U-sections 37, and between the bars 39 and the bottoms of the U-sections 37, around the screws 40, light coiled springs 41 are located, the tendency of which is to elevate the bars 39. When the lining member is placed around the table it rests at its lower edges on these bars and it is evident that, if desired, the lining member may be pressed downwardly at any point easily as the springs 41 are strong enough only to support the lining and no great extra force is required to bring the upper edges of the lining down a short distance if it should be necessary.

Figure 6:
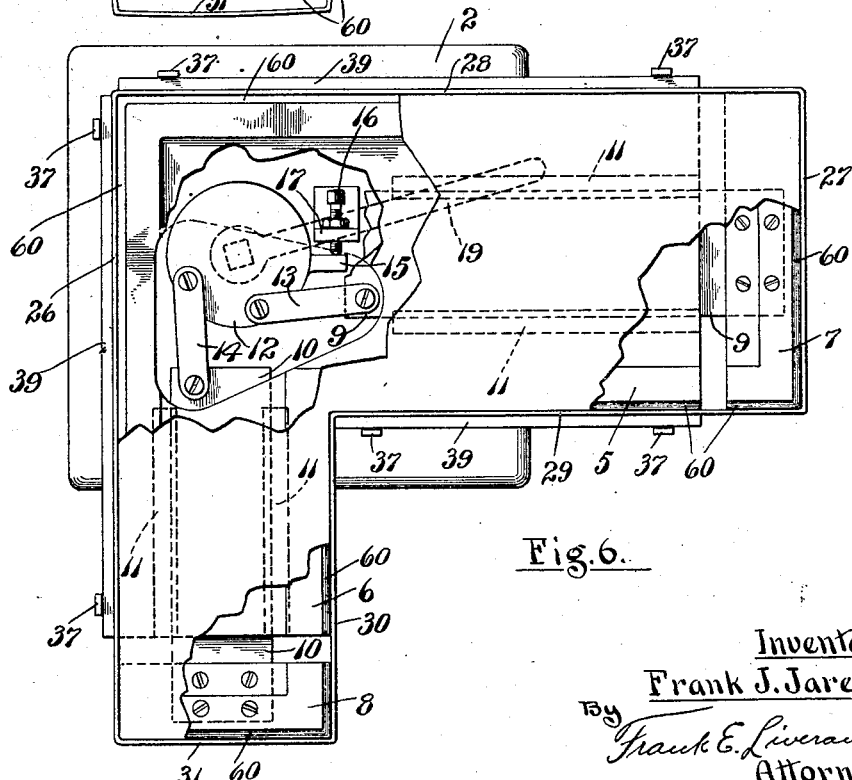
Fig. 6 is a similar view showing said inner clamps extended outwardly to engage against the inner sides of the lining.

In Fig. 5 the lining member is shown placed around the table, the sections 7 and 8 being in retracted position. Then by grasping the handle 19 and moving it so as to oscillate the member 12, said sections 7 and 8 are moved outwardly, as shown in Fig. 6, engaging and clamping against the inner sides of the parts 27 and 31 of the lining and causing the same to come snugly against the edges of the table all around the same, as shown in Fig. 6.

Figures 1, 2:
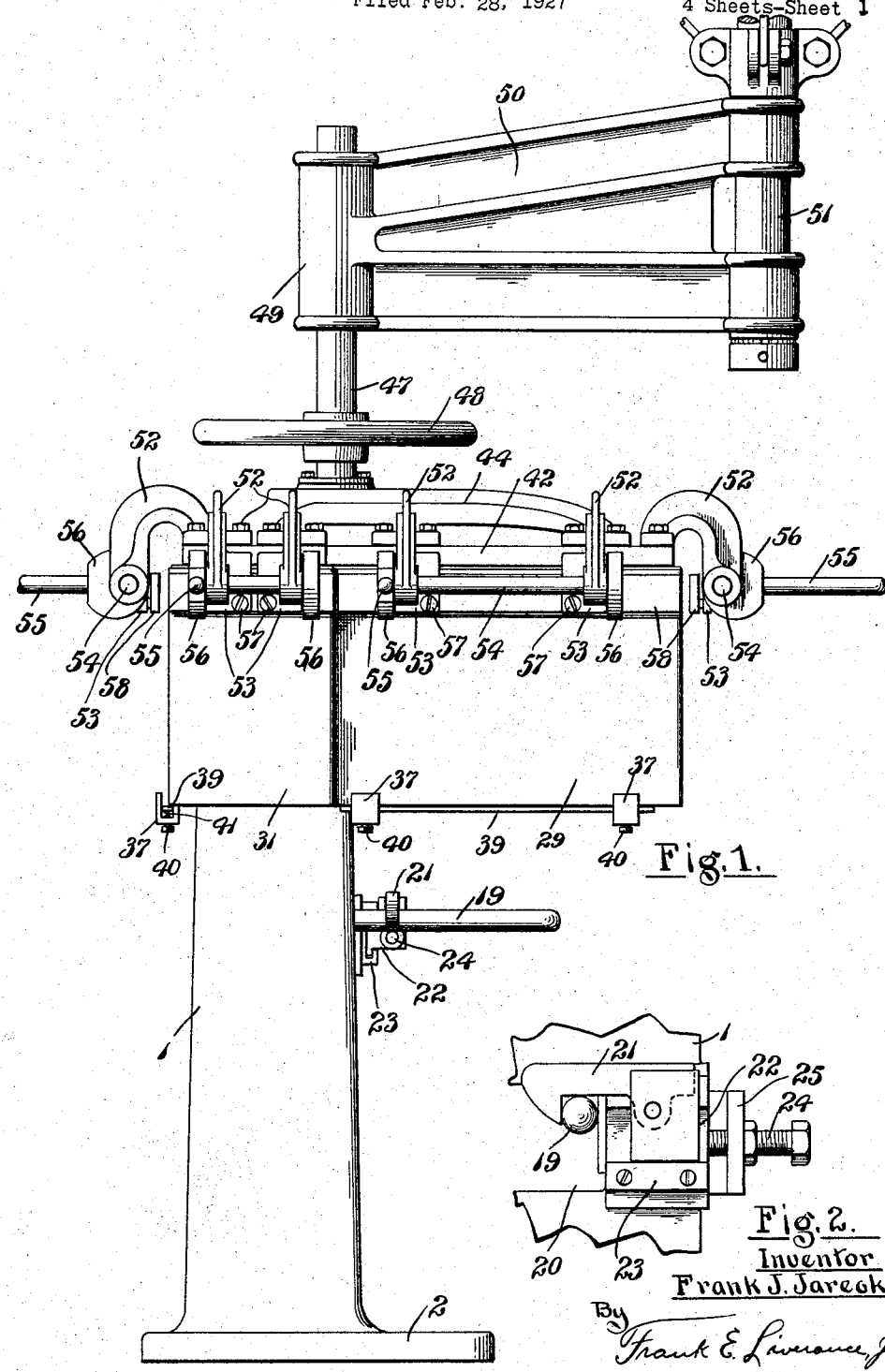
Fig. 2 is a fragmentary enlarged elevation of a detail of the construction, a latching device for holding the inner clamping members in their extended position against the inner sides of the lining.
Figure 3:
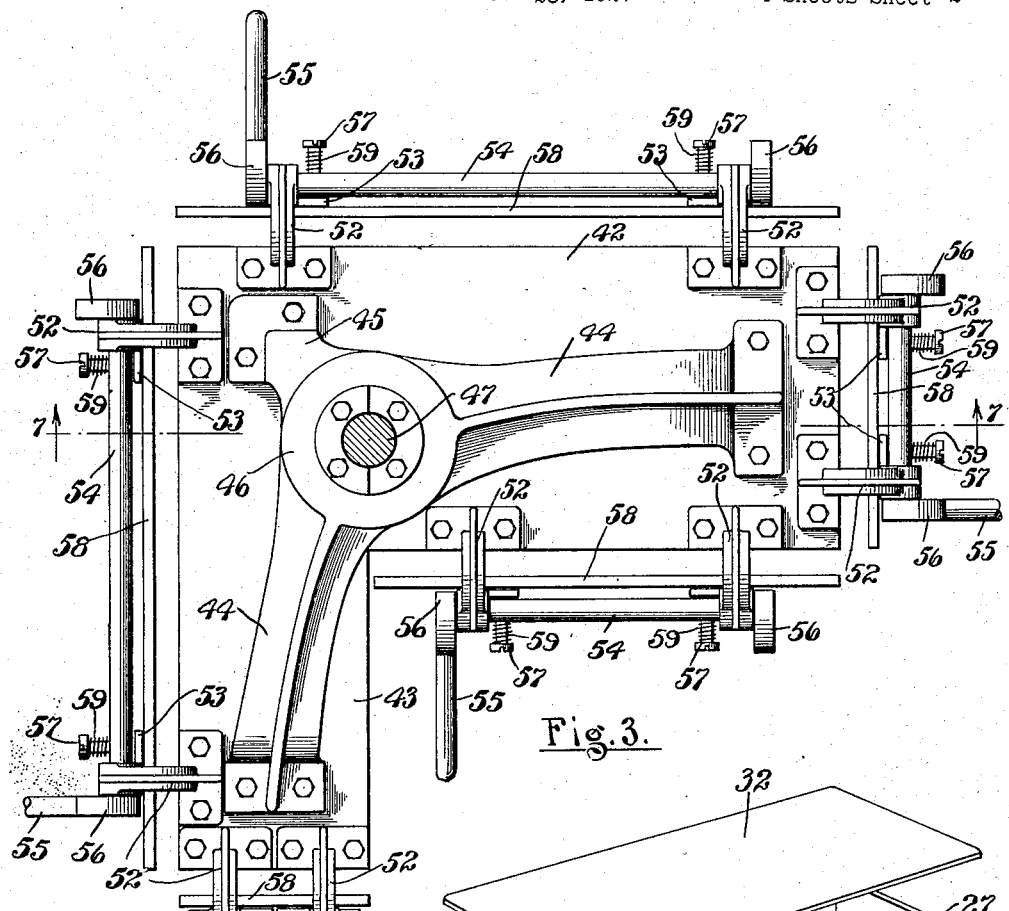
Fig. 3 is a plan view of the upper clamping head and the sides clamps mounted thereon.

Over the L-shaped table a clamping head of like shape is designed to be placed, having two sections 42 and 43 lying at right angles to each other (see Fig. 3). Said sections are long enough that their free ends reach nearly to the outer sides of the sections 7 and 8 when the same are extended outwardly their full distance. This clamping head is carried by a spider having arms 44 and 45 converging and integrally cast with a center 46. The center 46 of the spider is connected to the lower end of a vertical shaft 47, which is equipped with a hand wheel 48 near its lower end and, at its upper portion, threading through a vertical sleeve 49 at the end of a swinging arm 50 which is mounted for swinging movement about a vertical axis on the vertical shaft 51, as shown in Fig. 1. The head may be moved so as to lie directly over the table and then by operating the hand wheel 48 said head may be forced downwardly to clamp the back of the lining, consisting of the sections 32 and 33, in place over the L-shaped table and with its edges received within the edges of the sides and top and bottom of the lining member which is located around the table. This is fully shown in Fig. 7.

At the sides and ends of the clamping head, consisting of the two parts 42 and 43, clamping bars are mounted to clamp against the outer sides of the lining member which is placed around the table to firmly hold it in place. The clamping means used is the same at each side and end of the clamping head and a description of one describes all of them. A pair of spaced apart overhanging brackets 52 are permanently connected adjacent each side and end of the clamping head, the same extending upwardly and outwardly and then in a downward direction. Each of these brackets 52 at its outer lower end has an integral laterally extending flange 53. A horizontal shaft 54 is rotatably mounted through and extends between the pair of brackets. Said shaft may be rocked by means of a handle 55 and at each end of the shaft an eccentric 56 is mounted, the handle 55 being conveniently carried by one of the eccentrics. A pair of headed pins 57 pass freely, one through each of the flanges 53 and at their inner ends are connected to a horizontal clamping bar 58 which lies parallel to a side or end of the clamping head. Around each of the pins 57 and between its head and the flange 53 through which it passes, is a coiled compression spring 59. The tendency of the springs 59 is to move the pins and attached bar 58 outwardly. But by rocking or oscillating the shaft 54 and turning the eccentrics 56 the same coming against the outer side of the bar 58, moves it inwardly against the resistance of the springs 59 until it clamps against the outer side of the adjacent side, bottom or top of the lining member which is located around the table.

From the foregoing it is evident that a welding fixture has been provided with which a back or side or other portion of a refrigerator lining may be located and held for welding to the remainder of the refrigerator lining. The parts which are to be welded together are firmly held in place so that the same cannot change position during the welding operation. The welding can be accomplished very easily by either an acetylene blow torch or other suitable welding apparatus, following the joint around the edges of the member, in this case, the back having the sections 32 and 33, which is to be welded in place. The table sections and the extensions 7 and 8 thereto, at their upper corners are cut away and beveled as indicated at 60 so as to leave a continuous air space underneath the lining adjacent and the full length of the joint which is to be welded. This prevents the transmission of injurious temperatures and heat to the table and aids in the welding operation as the air underneath is not as good a conductor of heat as the metal of the table would be if it were in direct contact with the metal of the lining where the welding takes place.

While this fixture has been described in connection with an L-shaped refrigerator lining it is evident that it is not limited to welding linings of this particular shape, but may be readily employed with various other shapes of linings where a back is to be welded in place between the sides, tops and bottom of a lining. Accordingly, I do not wish to be limited to the specific disclosure made, but consider myself entitled to all forms of structure coming within the scope of the claims defining said invention.

I claim:

1. In a machine of the class described, a table around which a lining member may be placed, a clamping head over the table for holding a second lining member in fixed position with respect to the table and the first lining member, and clamping devices mounted on said clamping head to engage with the outer sides of the first lining member to clamp them against the edges of the table and in proper engagement with the edges of the second lining member so that the two lining members may be held in position for welding.

2. In a machine of the class described, a table having two table sections lying at right angles to each other, a member at the outer end of each section slidably mounted thereon and manually operable means for simultaneously moving said members outward or inward with respect to the respective ends of said table sections.

3. In a machine of the class described, a horizontal table having two sections lying at right angles to each other, a slide slidably mounted on each of said sections, a member having a length equal to the width of the adjacent table section carried at the outer end of each slide, an operating member mounted under the table to turn about a vertical axis, means for turning said member back and forth about its vertical axis, and two links connected at one end to said operating member, said links being connected at opposite ends one to the inner end of each slide, substantially as described.

4. In a machine of the class described, a vertical support, a horizontal table carried by said support having two sections lying at right angles to each other whereby said table is of L-shape, a member at the outer end of each section slidably mounted thereon for inward or outward movement with respect to the adjacent end of the table section on which it is mounted, means for moving said members simultaneously inward or outward, a clamping head mounted over the table, means for moving said head in a direction toward or away from the table, clamping bars mounted at sides and ends of the clamping head adapted to be forced inwardly toward the edges of the table, and means for moving said clamping bars inwardly toward the edges of the table.

5. In a construction of the class described, a horizontal table, a clamping head of like outline located over the table, manually operable means for moving said head toward or away from the upper side of the table, clamping bars mounted on the sides and ends of the clamping head adapted to be moved inwardly toward the sides and ends of the table, and manually operable means for moving said clamping bars toward the edges of the table, substantially as described.

6. In a machine of the class described, a horizontal table, a clamping head of like outline located over the table, means for manually moving said head toward or away from the upper side of the table, pairs of supporting brackets connected to the upper side of the table adjacent side and end edges thereof, said brackets being extended outwardly and then downwardly, a rock shaft mounted on each pair of brackets, cams on each rock shaft, means for rocking each rock shaft, and a clamping bar carried by each pair of brackets engaged by the cams on the shaft carried by said brackets whereby the bar is moved inwardly toward a side or end of the table on rocking the shaft in one direction.

7. A construction containing the elements in combination defined in claim 6 combined with spring means operatively associated with each clamping bar and acting to move the bar outward on rocking its associated shaft in the opposite direction.

8. In a machine of the class described, a horizontal table, a clamping head mounted over the table, means for carrying said head whereby the same may be swung to lie directly over the table or away therefrom, means for moving the head vertically toward or away from said table, clamping bars mounted on said head at the sides and ends thereof and depending below the head so as to come opposite sides and ends of the table, and manually operable means for moving said clamping bars inwardly toward the edges of the table.

In testimony whereof I affix my signature.

FRANK J. JARECKI.